(12) United States Patent
Kim et al.

(10) Patent No.: US 7,313,854 B2
(45) Date of Patent: Jan. 1, 2008

(54) METHOD OF MANUFACTURING A TACTILE SENSOR

(75) Inventors: Jong-ho Kim, Daejeon (KR); Dae-im Kang, Daejeon (KR); Yon-kyu Park, Daejeon (KR); Min-seok Kim, Daejeon (KR)

(73) Assignee: Korea Research Institute of Standards and Science (KR)

( * ) Notice: Subject to any disclaimer, the term of this patent is extended or adjusted under 35 U.S.C. 154(b) by 471 days.

(21) Appl. No.: 11/024,316

(22) Filed: Dec. 28, 2004

(65) Prior Publication Data

US 2005/0262676 A1    Dec. 1, 2005

(30) Foreign Application Priority Data

May 28, 2004    (KR) ................. 10-2004-0038357

(51) Int. Cl.
*G01R 3/00*    (2006.01)
(52) U.S. Cl. .............. 29/595; 29/25.35; 29/592.1; 29/846; 204/192.32; 204/192.33; 204/192.35; 216/62; 216/66; 216/67; 310/330; 310/331; 310/332; 361/170; 361/189; 73/865.4
(58) Field of Classification Search ............ 29/25.35, 29/592.1, 595, 846; 204/192.32, 192.33, 204/192.35; 216/62, 66, 67; 310/283, 301, 310/321, 328, 330, 331, 332; 361/170, 189; 73/865.4; 427/79, 70
See application file for complete search history.

(56) References Cited

U.S. PATENT DOCUMENTS

| | | | | |
|---|---|---|---|---|
| 4,766,666 | A | * | 8/1988 | Sugiyama et al. ......... 29/621.1 |
| 4,856,993 | A | * | 8/1989 | Maness et al. ................ 433/68 |
| 6,515,586 | B1 | * | 2/2003 | Wymore ..................... 340/541 |
| 2005/0021247 | A1 | * | 1/2005 | Liu et al. ...................... 702/42 |

* cited by examiner

*Primary Examiner*—Paul D. Kim
(74) *Attorney, Agent, or Firm*—Cantor Colburn LLP (57) ABSTRACT

A method of manufacturing a tactile sensor, which is capable of implementing a wide range of senses, including sensing contact pressure (vertical force and horizontal force) with an external object and heat caused by the contact pressure, comprises forming a side block formation pattern of a force sensor and forming a piezo-resistor formation pattern of a heat sensor; forming a piezo-resistor and depositing an oxide film on the piezo-resistor; forming contact holes and forming a line hole formation pattern; forming a metal line, a temperature measurement metal line, and a heater; depositing an oxide film on the metal line, the temperature measurement metal line, and the heater, and forming a load block on the oxide film; and forming a side block by etching a bottom surface of the wafer on which the load block is formed.

11 Claims, 8 Drawing Sheets

Fig.1

Prior Art

Fig.2

Prior Art

Fig.3

Prior Art

METHOD OF MANUFACTURING A TACTILE SENSOR

BACKGROUND OF THE INVENTION

1. Field of the Invention

The present invention relates to a tactile sensor, and more particularly to a tactile sensor and a method of manufacturing the same, which are capable of implementing a wide range of senses, including sensing contact pressure with an external object and heat caused by the contact pressure.

2. Description of the Related Art

At present, tactile functionalities to obtain information about environments, for example, contact pressure, surface roughness, temperature variation to thermal conductivity, etc., through contact is recognized as information acquisition media. Biomimic tactile sensors replacing human tactile sense are becoming increasingly important since they can be not only used for various medical treatments, diagnoses, and administrations, such as intravascular microscopic operation and cancer diagnosis, but also applied to tactile presentation technologies which are important for the future of virtual environment implementation technology.

As examples of the biomimic tactile sensors, force/torque sensors having 6 degrees of freedom used for wrists of industrial robots and sensors for detecting contact pressure and instantaneous slip for use in grippers of robots have been developed, however, these sensors have a problem of low sensitivity due to relatively large sensing units.

In addition, development possibility of the tactile sensors using MEMS (micro electro mechanical systems) manufacture technologies has been shown, however, these tactile sensors have a limitation in terms of acquisition of information about external environments since they are manufactured to acquire only information about contact pressure.

Accordingly, in order to develop practical biomimic tactile sensors, specifications of sensors for implementing a wide range of senses, including sensing contact pressure of skin with an external object and heat caused by the contact pressure are required.

In addition, in order to achieve smooth interaction between the biomimic tactile sensors and the surroundings, development of high speed signal processing systems for multi-channel array sensors according to sensor fusion is required.

Figure 1:
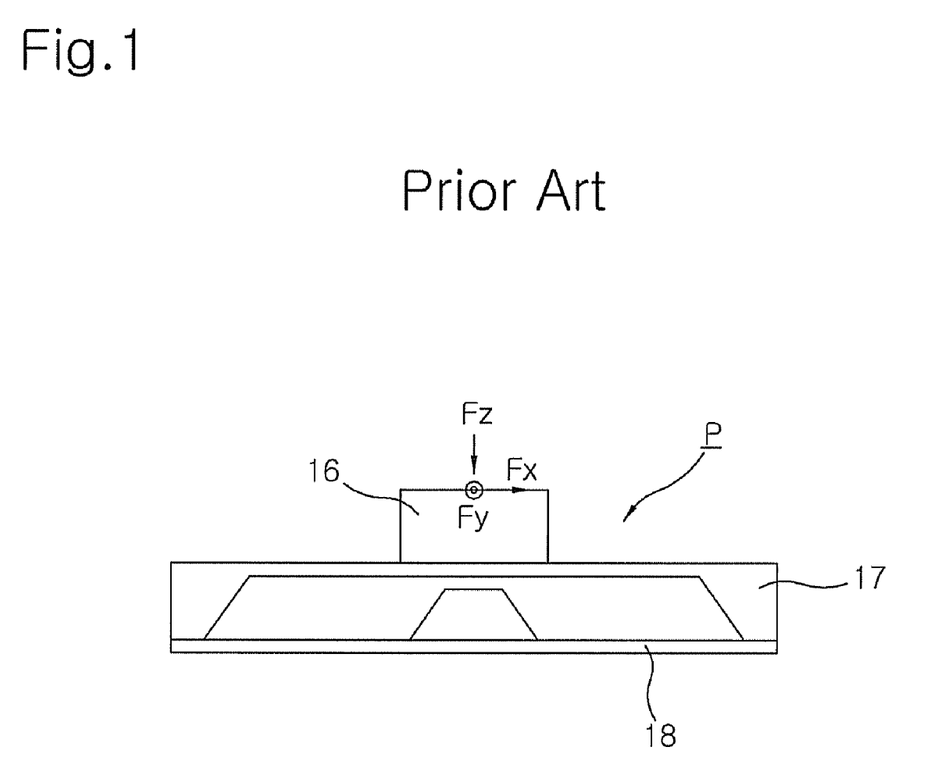
FIG. 1 is a front view illustrating a force sensor using a general MEMS technology.

On the other hand, as shown in FIG. 1, a force sensor P manufactured using the MEMS technology is configured as a rectangular film-type sensing unit encountering three loadings Fx, Fy and Fz. The sensing unit consists of a loading block 16 and a side block 17 for supporting the overall structure. A overload protection block 18, which is manufactured using a silicon micromachining technique, for preventing breakage of the sensing unit when overload is imposed on the sensing unit is bonded to the sensing unit.

Figure 2:
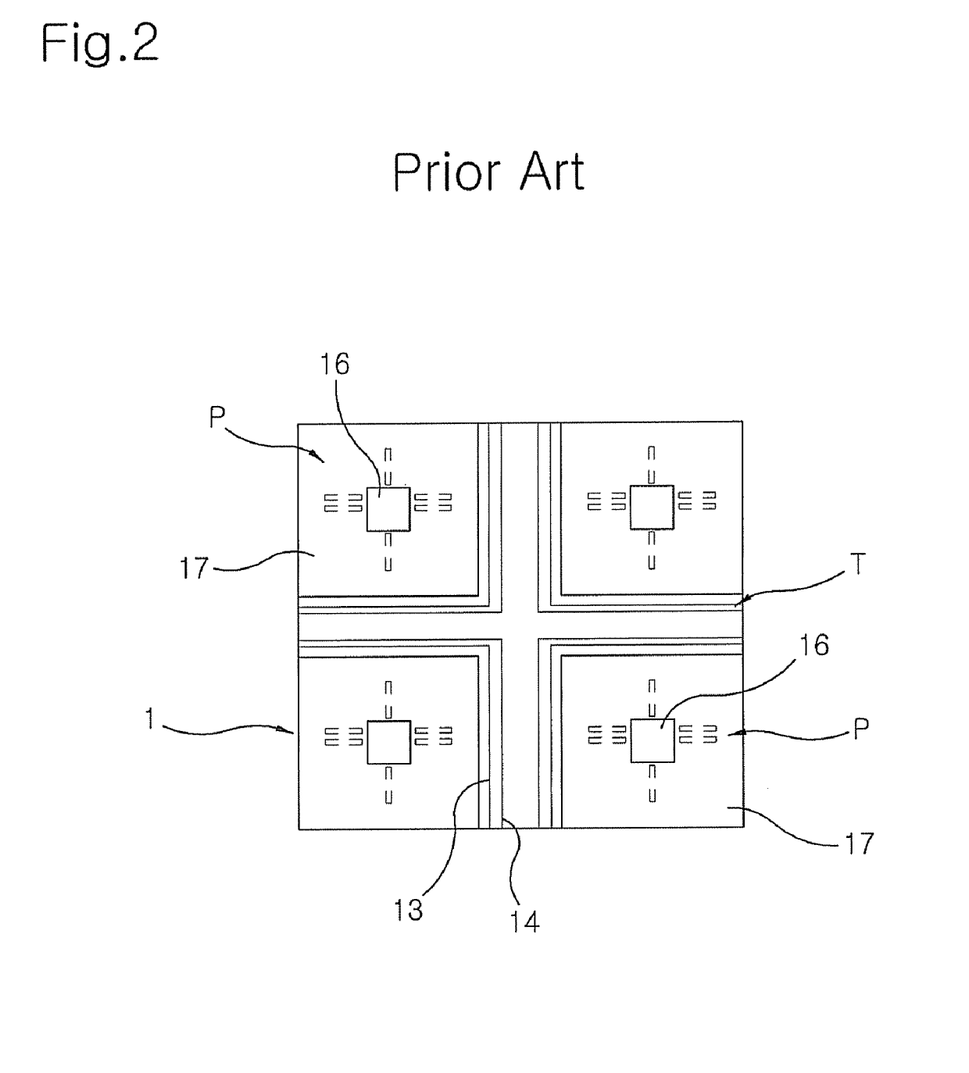
FIG. 2 is a plan view illustrating a tactile sensor using the MEMS technology
Figure 3:
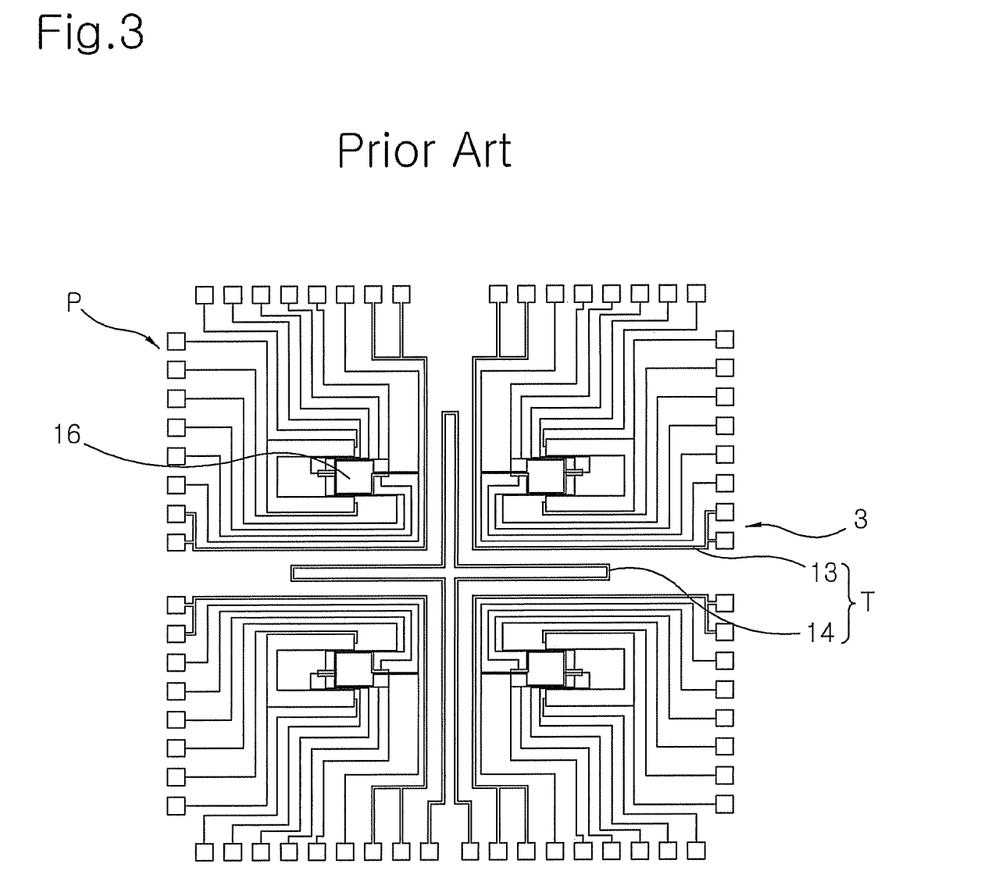
FIG. 3 is a circuit diagram of FIG. 2.

FIG. 2 is a plan view illustrating a tactile sensor manufactured using the MEMS technology and FIG. 3 is a circuit diagram of FIG. 2. As shown in FIGS. 2 and 3, four fine force sensors P each consisting of the loading block 16 and the side block 17 as described above and four heat sensors T each consisting of a metal line for temperature measurement 13 and a heater 14 are formed on a wafer 1. This application relates to manufacture of a practical tactile sensor using the MEMS technology.

SUMMARY OF THE INVENTION

Therefore, it is an object of the present invention to provide a method of manufacturing a tactile sensor which is capable of implementing a wide range of senses, including sensing contact pressure (vertical force and horizontal force) with an external object and heat caused by the contact pressure.

In accordance with an aspect of the present invention, the above and other objects can be accomplished by the provision of a method of manufacturing a tactile sensor, comprising: a first step of forming a side block formation pattern of a force sensor on a bottom surface of a wafer, and forming a piezo-resistor formation pattern of a heat sensor on a top surface of the wafer; a second step of forming a piezo-resistor on the top surface of the wafer through an ion implantation process and depositing an oxide film on the piezo-resistor; a third step of forming contact holes on the piezo-resistor and forming a line hole formation pattern on the oxide film of the heat sensor; a fourth step of forming a metal line, which is a connection line between the contact holes, and a temperature measurement metal line and a heater of the heat sensor on the top surface of the wafer are formed by a metal deposition process and a lift off process; a fifth step of depositing an oxide film on the metal line, the temperature measurement metal line, and the heater, and forming a load block on the oxide film through deposition and etching; and a sixth step of forming a side block of the force sensor by etching the bottom surface of the wafer on which the load block is formed.

Preferably, the wafer is a silicon wafer.

Preferably, the first step includes depositing an oxide film and a nitride film on both sides of the wafer, forming the side block formation pattern on the bottom surface of the wafer, removing the nitride film deposited on the top surface of the wafer, and forming the piezo-resistor formation pattern on the oxide film.

Preferably, the second step includes etching the oxide film exposed on the top surface of the wafer according to the piezo-resistor formation pattern using buffered oxide etchant (BOE), removing the nitride film exposed on the bottom surface of the wafer according to the side block formation pattern, and forming the piezo-resistor formation pattern on the top surface of the wafer by ion implantation.

Preferably, the third step includes applying a photoresist on the oxide film deposited on the top surface of the wafer in the second step, etching the oxide film exposed on the bottom surface of the wafer using buffered oxide etchant (BOE), and forming a contact hole formation pattern.

Preferably, the metal layer formed in the fourth step comprises one selected from a group consisting of titanium, nickel and gold, or an alloy thereof.

Preferably, the deposition of the oxide film in the fifth step includes performing a plasma enhanced chemical vapor deposition (PECVD) process.

Preferably, the load block formed in the fifth step is formed with a thick photoresist (SU-8).

Preferably, the etching in the sixth step is performed using potassium hydroxide (KOH).

Preferably, the load block is formed at a middle portion on the side block.

Preferably, the method of manufacturing a tactile sensor further comprises forming an overload protection block beneath the side block in such a manner that a top surface of the overload protection block is separated from a bottom surface of the side block.

In accordance with another aspect of the present invention, the above and other objects can be accomplished by the provision of a tactile sensor manufactured according to the method of manufacturing the tactile sensor.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF THE PREFERRED EMBODIMENTS

Hereinafter, a method of manufacturing a tactile sensor according to the present invention will be described in detail with reference to the accompanying drawings.

Figure 4A:
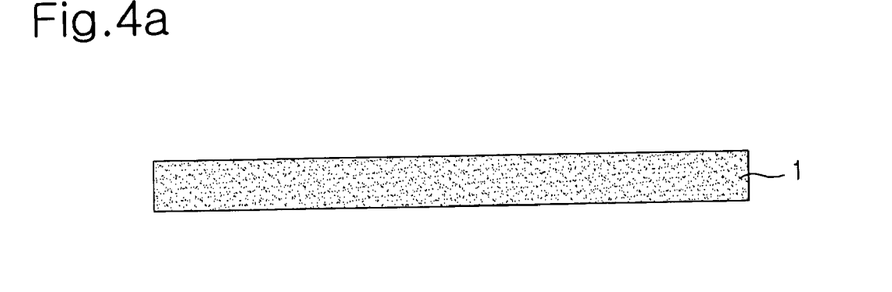
FIGS. 4a to 4t are diagrams illustrating successive steps in a method of manufacturing a tactile sensor according to the present invention.
Figure 4B:
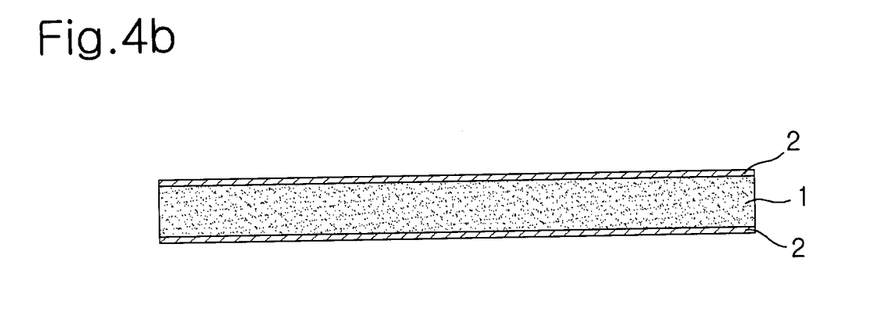
Figure 4C:
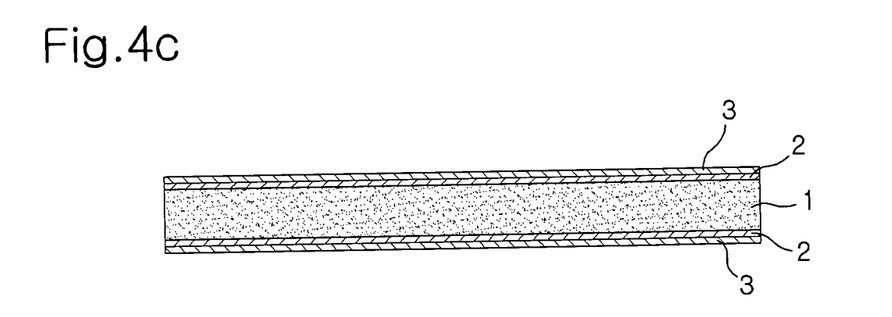
Figure 4D:
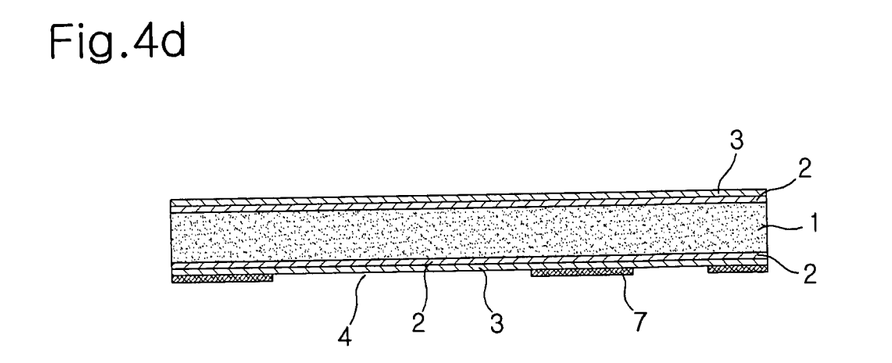
Figure 4E:
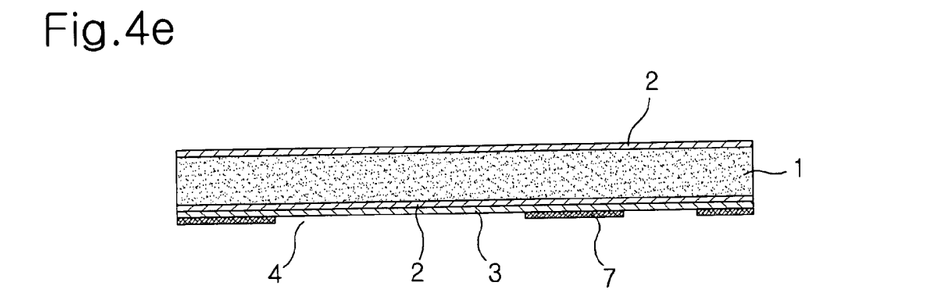
Figure 4F:
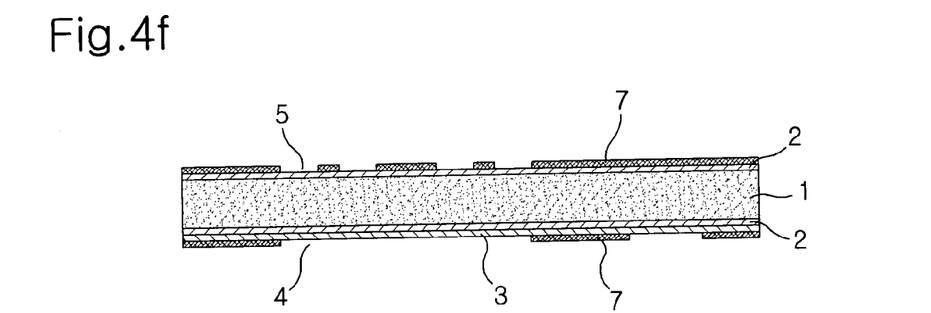
Figure 4G:
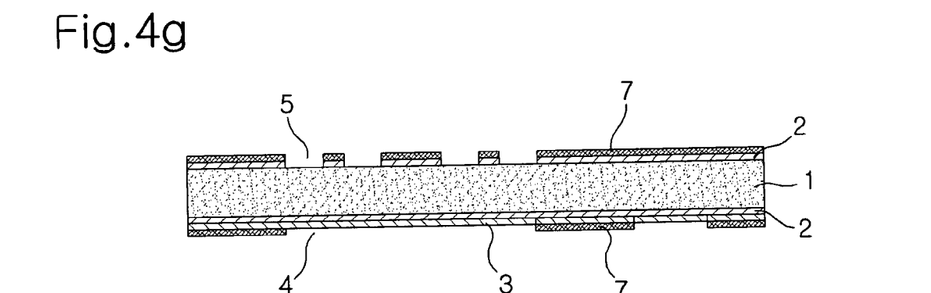
Figure 4H:
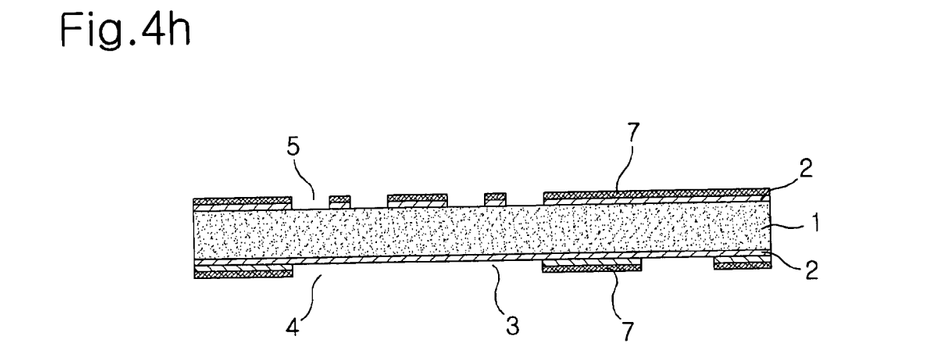
Figure 4I:
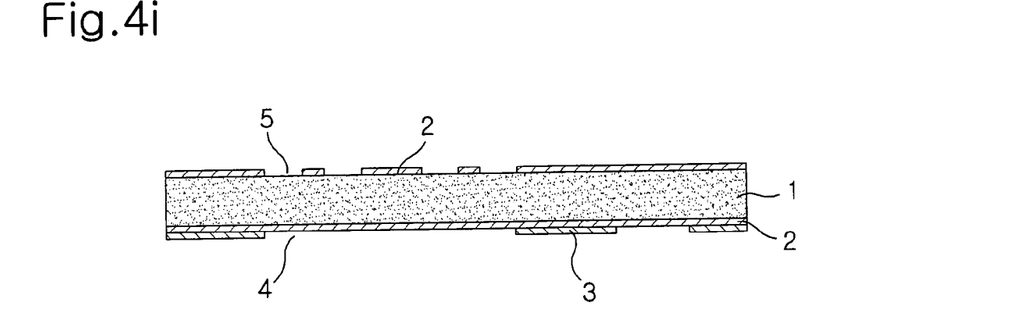
Figure 4J:
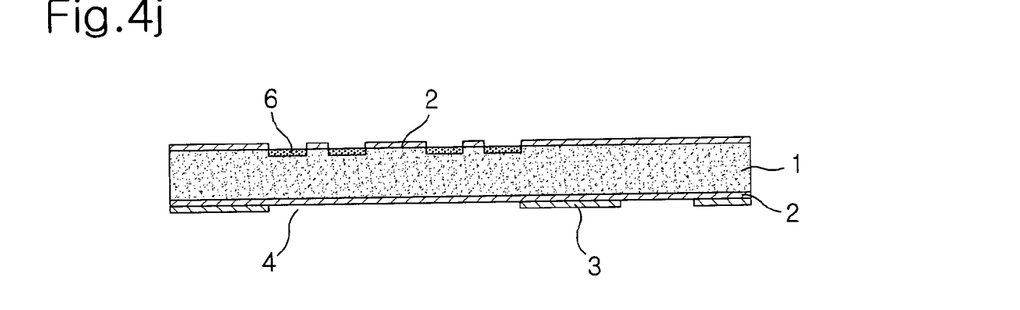
Figure 4K:
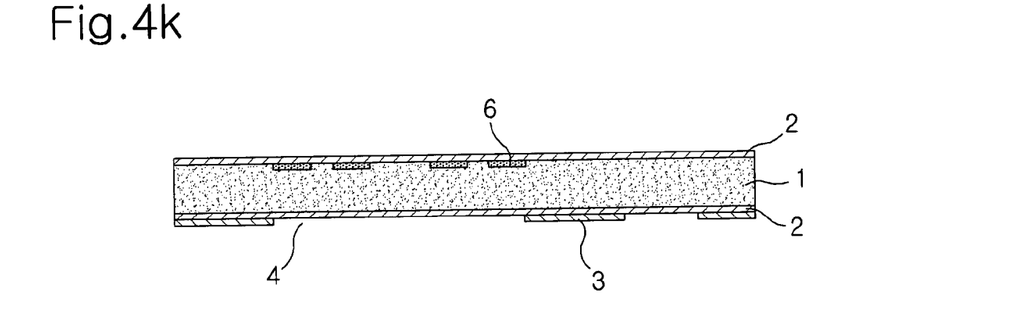
Figure 4L:
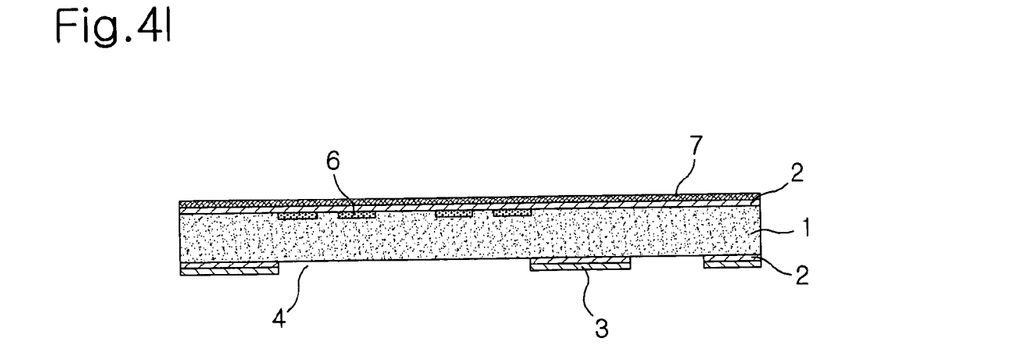
Figure 4M:
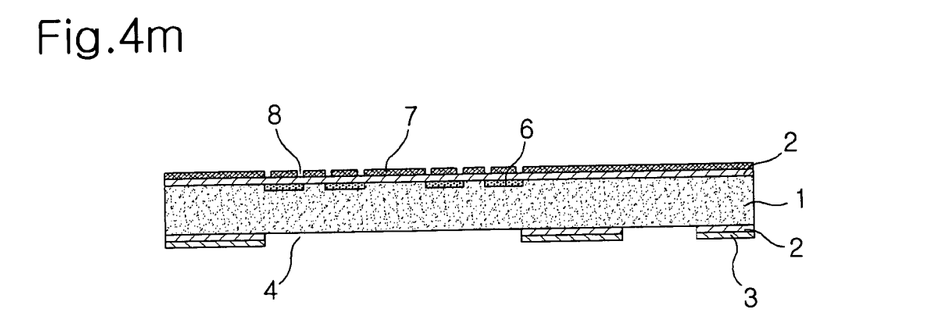
Figure 4N:
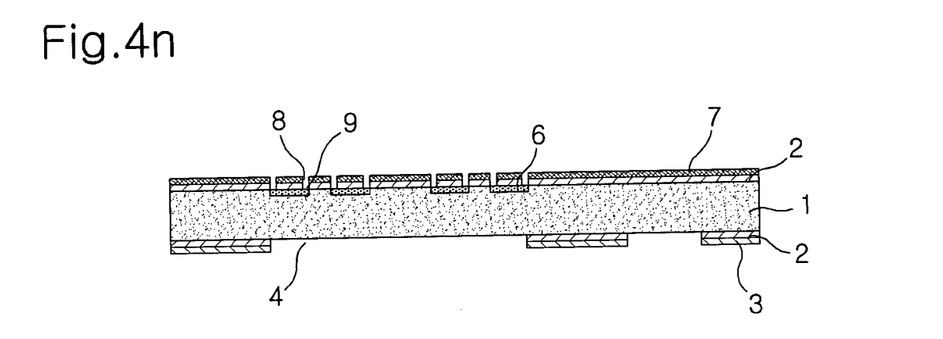
Figure 4O:
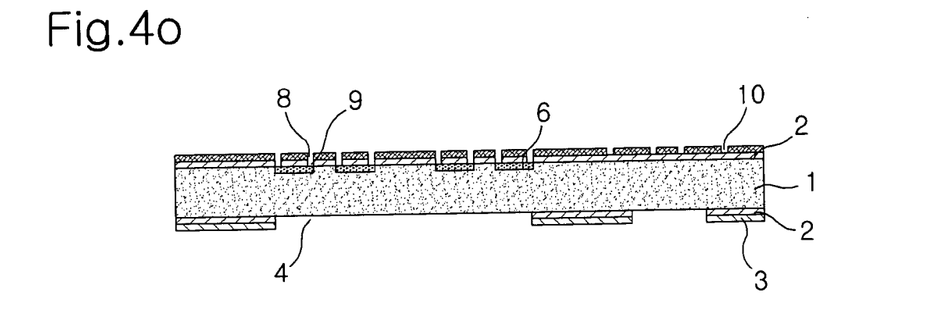
Figure 4P:
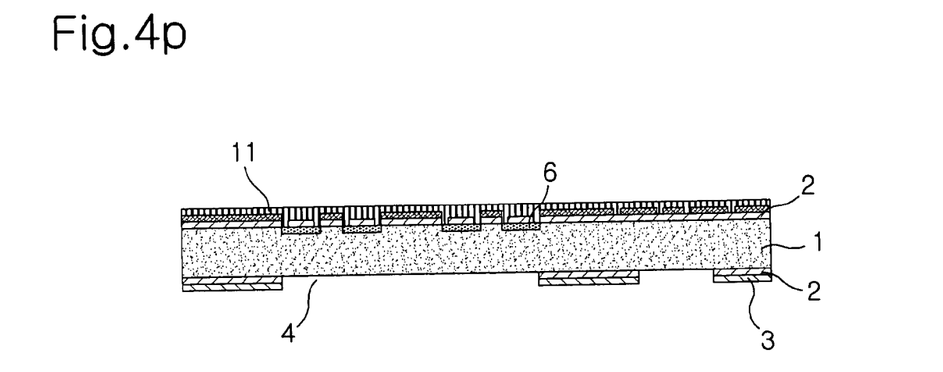
Figure 4Q:
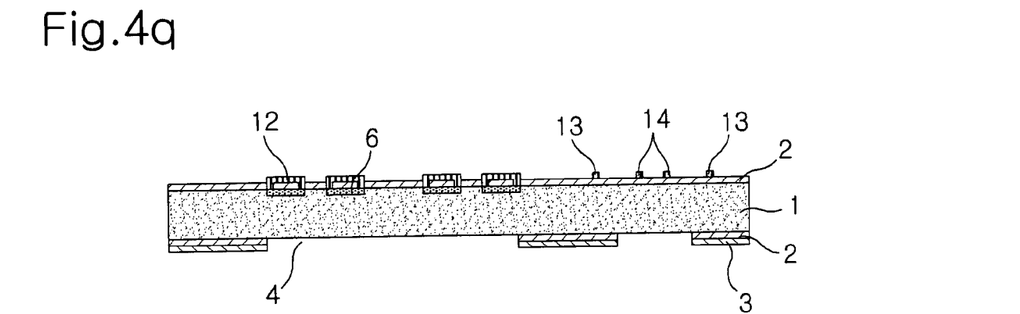
Figure 4R:
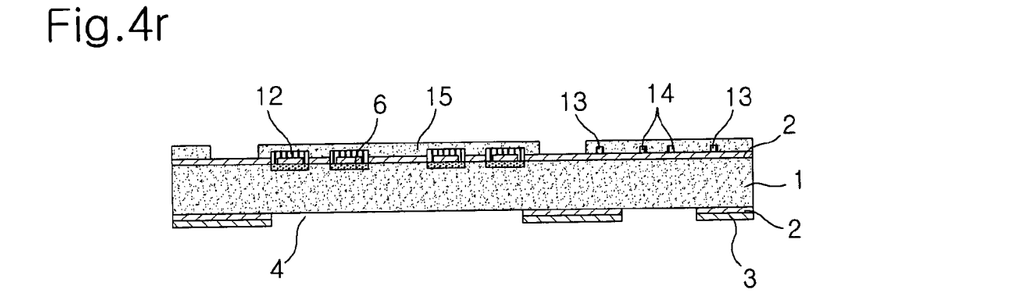
Figure 4S:
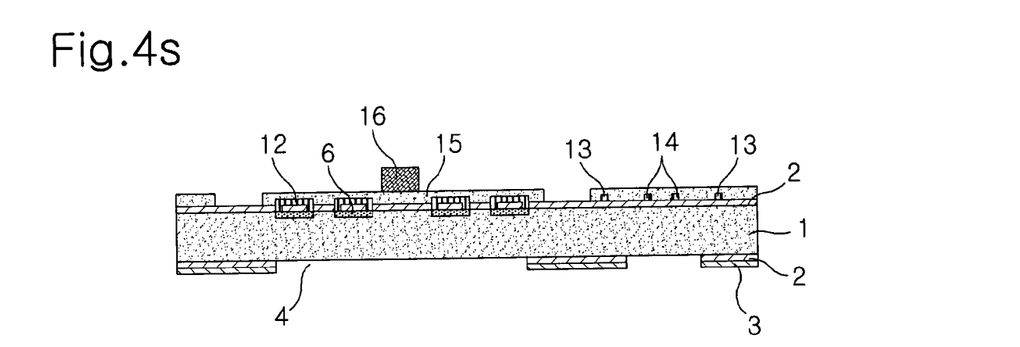
Figure 4T:
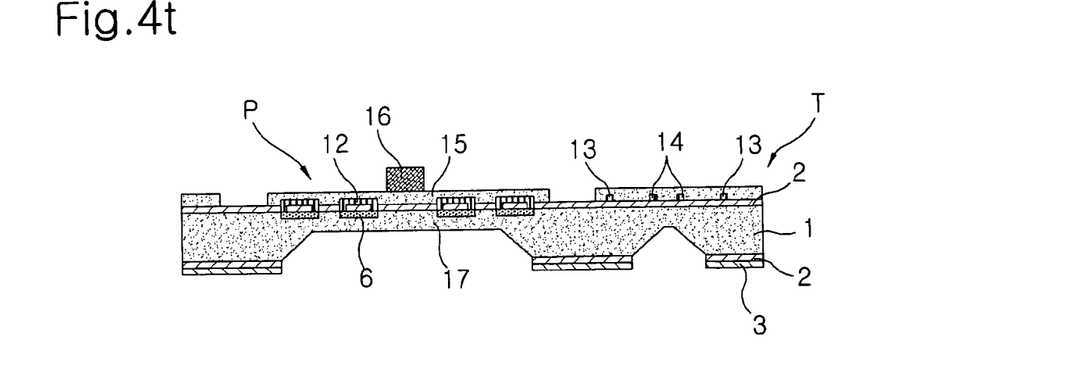

FIGS. 4a to 4t are diagrams illustrating successive steps in a method of manufacturing a tactile sensor according to the present invention.

(First Step)

As shown in FIG. 4b, to begin with, an oxide film 2 is deposited on both sides of a silicon wafer 1. Subsequently, a nitride film 3 is deposited on the oxide film 2, as shown in FIG. 4c, and then, a photoresist 7 is deposited and selectively etched on the nitride film 3 through a photolithography process to form a side block formation pattern 4 on a bottom surface of the wafer 1, as shown in FIG. 4d.

Next, the nitride film 3 deposited on the top surface of the wafer 1 is removed by a strip off process using reactive ion etching (RIE), as shown in FIG. 4e, and then, a photoresist 7 is deposited and selectively etched on the oxide film 2 through a photolithography process to form a piezo-resistor formation pattern 5 of a force sensor on the top surface of the wafer, as shown in FIG. 4f.

(Second Step)

The oxide film 2 exposed on the top surface of the wafer 1 according to the piezo-resistor formation pattern 5, as shown in FIG. 4f, is etched using buffered oxide etchant (BOE), as shown in FIG. 4g, and the nitride film exposed on the bottom surface of the wafer 1 according to the side block formation pattern 4 is removed by the strip off process using reactive ion etching (RIE), as shown in FIG. 4h.

After the nitride film 3 is removed, a piezo-resistor 6 is formed on the top surface of the wafer by ion implantation. To this end, the photoresists 7 remaining in the top and bottom surfaces of the wafer 1, as shown in FIG. 4i, and then, the piezo-resistor is formed on the top surface of the wafer by ion implantation, as shown in FIG. 4j. Next, the oxide film 2 is deposited on the piezo-resistor 6 in order to protect the piezo-resistor 6, as shown in FIG. 4k.

(Third Step)

In order to form a contact hole 9 on the piezo-resistor 6, as shown in FIG. 4n, the photoresist 7 is applied on the oxide film 2 and then the oxide film 2 exposed on the bottom surface of the wafer 1 by the side block formation pattern 4 is etched away using buffered oxide etchant (BOE), as shown in FIG. 4l.

Also, a contact hole formation pattern 8 is formed on the top surface of the wafer 1 through the photolithography process, as shown in FIG. 4m. Subsequently, the oxide film 2 exposed on the top surface of the wafer 1 according to the contact hole formation pattern 8 is removed using buffered oxide etchant BOE to form the contact hole 9 on the top surface of the wafer 1, as shown in FIG. 4n.

Next, the photoresist 7 remaining on the top surface of the wafer 1 is removed and is again applied to the top surface of the wafer 1 with the contact hole 9 formed, and then, through the photolithography process for the photoresist 7 in a portion other than a portion where the contact hole 9 is formed, a line hole formation pattern 10 of a heat sensor T is formed on the oxide film 2, as shown in FIG. 4o.

(Fourth Step)

In order to make an electrical connection between the contact holes 9 and to form a temperature measurement metal line 13 and a heater 14 of the heat sensor T according to the line hole formation pattern 10, as shown in FIG. 4q, a metal layer 11 is deposited on the top surface of the wafer 1 using an E-beam source, as shown in FIG. 4p. The metal layer 11 is one selected from a group consisting of titanium (Ti), nickel (Ni), gold (Au), or alloys thereof.

Then, a metal line 12 of the force sensor, which is a connection line between the contact holes 9, and the temperature measurement metal line 13 and the heater 14 are formed by a lift off process, as shown in FIG. 4q.

(Fifth Step)

An oxide film 15 is deposited on the metal line 12, the temperature measurement metal line 13, and the heater 14 using a PECVD (plasma enhanced chemical vapor deposition) process, as shown in FIG. 4r.

Then, after the oxide film 15 is selectively etched using the reactive ion etching (RIE) process, a load block consisting of a thick photoresist (SU-8) is formed on the oxide film 15 using the photolithography process, as shown in FIG. 4s.

(Sixth Step)

A side block 17 of the force sensor is formed by etching the bottom surface of the wafer 1 on which the load block is formed, using potassium hydroxide (KOH), as shown in FIG. 4t. Herein, the side block 17 is formed such that the load block 16 is positioned at a middle portion on the side block 17. Accordingly, the force sensor P consisting of the load block 16 and the side block 7 and the heat sensor T consisting of the temperature measurement metal line 13 and the heater 14 can be formed.

On the other hand, the method of manufacturing a tactile sensor according to the present invention further comprises forming an overload protection block 18 beneath the side block 17. In this step, the top surface of the overload protection block 18 is separated from the bottom surface of the side block 17.

As apparent from the above description, the present invention provides a method of manufacturing a tactile sensor, which is capable of implementing a wide range of senses, including sensing contact pressure with an external object and heat caused by the contact pressure, which results in remarkable improvement of sensitivity. Accordingly, the tactile sensor of the present invention can be appropriately used in various industries including medical treatment, diagnosis, and administration, such as intravascular microscopic operation and cancer diagnosis, and moreover, can be effectively applied to tactile presentation technologies, which are important for the future of virtual environment implementation technology.

Although the preferred embodiment of the present invention has been disclosed for illustrative purposes, those skilled in the art will appreciate that various modifications, additions and substitutions are possible, without departing from the scope and spirit of the invention as disclosed in the accompanying claims.

What is claimed is:

1. A method of manufacturing a tactile sensor, comprising:
   a first step of forming a side block formation pattern of a force sensor on a bottom surface of a wafer, and forming a piezo-resistor formation pattern of a heat sensor on a top surface of the wafer;
   a second step of forming a piezo-resistor on the top surface of the wafer through an ion implantation process and depositing an oxide film on the piezo-resistor;
   a third step of forming contact holes on the piezo-resistor and forming a line hole formation pattern on the oxide film of the heat sensor;
   a fourth step of forming a metal line, which is a connection line between the contact holes, and a temperature measurement metal line and a heater of the heat sensor on the top surface of the wafer are formed by a metal deposition process and a lift off process;
   a fifth step of depositing an oxide film on the metal line, the temperature measurement metal line, and the heater, and forming a load block on the oxide film through deposition and etching; and
   a sixth step of forming a side block of the force sensor by etching the bottom surface of the wafer on which the load block is formed.

2. The method as set forth in claim 1, wherein the wafer is a silicon wafer.

3. The method as set forth in claim 1, wherein the first step includes depositing an oxide film and a nitride film on both sides of the wafer, forming the side block formation pattern on the bottom surface of the wafer, removing the nitride film deposited on the top surface of the wafer, and forming the piezo-resistor formation pattern on the oxide film.

4. The method as set forth in claim 1, wherein the second step includes etching the oxide film exposed on the top surface of the wafer according to the piezo-resistor formation pattern using buffered oxide etchant (BOE), removing the nitride film exposed on the bottom surface of the wafer according to the side block formation pattern, and forming the piezo-resistor formation pattern on the top surface of the wafer by ion implantation.

5. The method as set forth in claim 1, wherein the third step includes applying a photoresist on the oxide film deposited on the top surface of the wafer in the second step, etching the oxide film exposed on the bottom surface of the wafer using buffered oxide etchant (BOE), and forming a contact hole formation pattern.

6. The method as set forth in claim 1, wherein the metal layer formed in the fourth step comprises one selected from a group consisting of titanium, nickel and gold, or an alloy thereof.

7. The method as set forth in claim 1, wherein the deposition of the oxide film in the fifth step includes performing a plasma enhanced chemical vapor deposition (PECVD) process.

8. The method as set forth in claim 1, wherein the load block formed in the fifth step is formed with a thick photoresist (SU-8).

9. The method as set forth in claim 1, wherein the etching in the sixth step is performed using potassium hydroxide (KOH).

10. The method as set forth in claim 1, wherein the load block is formed at a middle portion on the side block.

11. The method as set forth in claim 1, further comprising: forming an overload protection block beneath the side block in such a manner that a top surface of the overload protection block is separated from a bottom surface of the side block.

* * * * *